US006754819B1

(12) United States Patent
Wootten et al.

(10) Patent No.: US 6,754,819 B1
(45) Date of Patent: Jun. 22, 2004

(54) METHOD AND SYSTEM FOR PROVIDING CRYPTOGRAPHIC SERVICES IN A DISTRIBUTED APPLICATION

(75) Inventors: Jonathan G. Wootten, Queen Creek, AZ (US); Richard A. Perona, Gilbert, AZ (US); Clifford A. Williams, Phoenix, AZ (US); Karl Krummel, Scottsdale, AZ (US); Donald B. Harbin, Scottsdale, AZ (US); Gregory R. Osborn, Chandler, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 793 days.

(21) Appl. No.: 09/610,740

(22) Filed: Jul. 6, 2000

(51) Int. Cl.[7] ................................................ H04L 9/00
(52) U.S. Cl. ...................................... 713/150; 713/167
(58) Field of Search .................................. 713/150, 167

(56) References Cited

U.S. PATENT DOCUMENTS

| | | | | |
|---|---|---|---|---|
| 5,029,206 A | * | 7/1991 | Marino et al. ............. | 713/164 |
| 5,253,297 A | * | 10/1993 | Press ............................ | 713/166 |
| 5,365,591 A | | 11/1994 | Carswell et al. ............ | 380/49 |
| 5,369,702 A | * | 11/1994 | Shanton ....................... | 713/166 |
| 5,386,471 A | * | 1/1995 | Bianco ......................... | 713/162 |
| 5,764,982 A | * | 6/1998 | Madduri ...................... | 709/330 |
| 5,781,633 A | * | 7/1998 | Tribble et al. ............... | 713/167 |
| 5,940,516 A | * | 8/1999 | Mason et al. ................ | 713/159 |
| 5,946,399 A | * | 8/1999 | Kitaj et al. ................... | 713/189 |
| 5,995,628 A | * | 11/1999 | Kitaj et al. ................... | 713/164 |
| 6,055,636 A | * | 4/2000 | Hillier et al. ................ | 713/200 |

FOREIGN PATENT DOCUMENTS

WO      0435094      7/1991

OTHER PUBLICATIONS

Gutmann, Peter, "An Open–source Cryptographic Coprocessor", 9th USENIX Security Symposium Paper 2000, pp. 97–112 of the Proceedings.*
XP–001017161, T. Peacock, "Features and Utilization of Motorola's Advanced INFOSEC Machine, AIM, in Embedded Encryption Applications," IEEE 2000 International Performance, Computing and Communications Conference, Feb. 20, 2000, pp. 423–429.

* cited by examiner

Primary Examiner—Kim Vu
Assistant Examiner—Ronald Baum
(74) Attorney, Agent, or Firm—Lowell W. Gresham; Jordan M. Meschkow; Meschkow & Gresham, PLC

(57) ABSTRACT

A data security system (26) provides cryptographic services in a multiprocessor platform (20) supporting a distributed application (22). The distributed application (22) includes a cryptographic object (52) that is executable exclusively on the data security system (26). An input interface object (102), a cryptographic function (90), and an output interface objection (104) form the cryptographic object (52). The data security system (26) includes a first processor element (92) for executing the input interface object (102), a second processor element (94) for executing the cryptographic function (90), and a third processor element (96) for executing the output interface object (104). The combination of data security system (26) and cryptographic object (52) ensures the separation of plain text data (46) from cipher text data (48).

16 Claims, 2 Drawing Sheets

METHOD AND SYSTEM FOR PROVIDING CRYPTOGRAPHIC SERVICES IN A DISTRIBUTED APPLICATION

TECHNICAL FIELD OF THE INVENTION

The present invention relates to the field of cryptographic systems. More specifically, the present invention relates to providing cryptographic services within a distributed application supported by a multiprocessor platform.

BACKGROUND OF THE INVENTION

An encryption system converts data into a disguised or encrypted form to render it unintelligible to anyone without a decryption key. Its intended purpose is to ensure privacy by keeping the information hidden from anyone for whom it is not intended. Many techniques and functions are known for the conversion of the original data, referred to herein as plain text data, into its encrypted form, referred to herein as cipher text data.

Encryption systems are conventionally implemented in a combination of software functions and custom encryption hardware that contains redundant encryption functions. The redundant encryption functions of the custom encryption hardware include operational checks that ensure that the plain text is being effectively encrypted. In some environments, for example in wireless communication devices, it is undesirable to implement the custom encryption hardware for security due to size and power constraints.

To reduce the size and power constraints associated with custom encryption hardware, some encryption systems are implemented entirely as software cryptographic functions. These cryptographic functions can then be programmed into memory of the existing processor equipment, thereby reducing the size and power constraints. However, encryption systems implemented in software have traditionally been perceived to be less secure than hardware implementations because software encryption functions can become modified or corrupted. Moreover, software encryption functions generally do not contain the same operational checks as functions implemented in the custom encryption hardware. Thus, it is difficult to ensure that the correct software encryption functions are being properly executed.

In addition, it is difficult to verify that the prior art cryptographic algorithms are operating in real time. The term "real time" refers to the ability of the encryption system to output cipher text data at substantially the same rate as the plain text data is being input into the system. Accordingly, the conversion of plain text data to cipher text data may not occur within the time constraints of the system, for example, a radio communications system resulting in poor or non-existent communications. Moreover, conventional software encryption algorithms are unable to detect this loss of separation between the plain text data and this poor or non-existent communication, which is an undesirable situation.

Cryptographic functions have been typically employed in communication networks such as wireless/wire-line, and voice and/or data networks. In addition, emerging technologies such as financial applications (banking/electronic funds transfer), Internet electronic commerce applications, and secured database applications typically employ cryptographic services such as access control and privacy enforcement.

A distributed application is an application for which the collection of software components, or processing elements, is distributed between two or more interconnected processors. These interconnected processors, resident on one or more machines or cards, form a multiprocessor platform for simultaneously executing two or more software components of the distributed application. The increasing use of distributed applications in systems where data security is imperative, such as the aforementioned communications networks, financial applications (banking/electronic funds transfer), Internet electronic commerce applications, and secured database applications, has led to the inclusion of cryptographic services within the distributed applications.

A distributed application which manipulates cryptographic data suffers from many of the same problems found in conventional encryption systems. That is, the distributed application conventionally employs a secure operating system, custom hardware, or a combination of a secure operating system and custom hardware to provide for a secure separation of plain text data (also referred to as RED data) from cipher text data (also referred to as BLACK data). This requires that the developer of the distributed application understand exactly how the underlying multiprocessor platform is designed. Furthermore, the developer is required to develop the distributed application for the specific combination of hardware and software. This results in a customized distributed application having cryptographic functions for manipulating cryptographic data. Unfortunately, such customization results in a distributed application with little portability to other multiprocessor platforms, having a long development time, being costly to maintain, and being costly to add new cryptographic capabilities as cryptographic functions evolve.

Accordingly, what is needed is a system and a method for providing cryptographic services in a multiprocessor platform separate from a distributed application supported by the multiprocessor platform. In addition, what is needed is a system and a method that ensure the separation of plain text data from cipher text data in the multiprocessor platform. Furthermore, a system and method are needed that provide for a flexible environment for the development and execution of security enabled distributed applications, allow for reduced maintenance costs, and allow for the extension of cryptographic capabilities.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
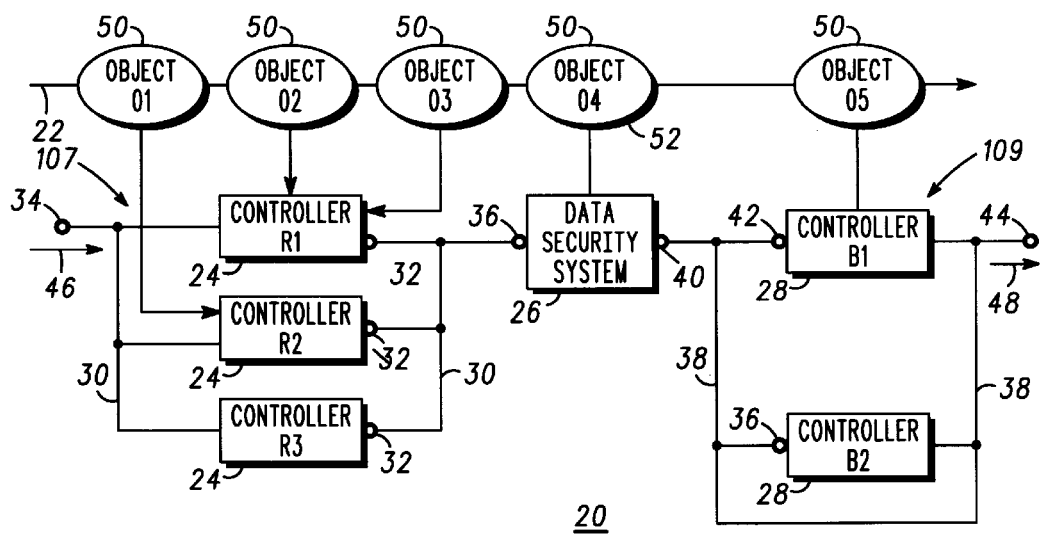
FIG. 1 shows a block diagram of a multiprocessor platform supporting a distributed application.

FIG. 1 shows a simplified block diagram of a multiprocessor platform 20 supporting a distributed application 22. Multiprocessor platform 20 includes first controllers 24, a data security system 26, and second controllers 28. Data security system 26 is advantageously employed in multiprocessor platform 20 to provide cryptographic services while separating the cryptographic function used to provide those services from the remaining processing activities performed by distributed application 22.

First controllers 24 are interconnected by a first communication bus 30. First communication bus 30 further couples outputs 32 of first controllers 24 and an input 34 of multiprocessor platform 20 to an input 36 of data security system 26. Likewise, second controllers 28 are interconnected by a second communication bus 38. Second communication bus 38 further couples an output 40 of data security system 26 to inputs 42 of second controllers 28 and to an output 44 of multiprocessor platform 20.

First and second controllers 24 and 28, respectively, may employ commercial hardware and software (e.g., real time operating systems, communication protocols, and so forth) to form the basis for multiprocessor platform 20. First and second controllers 24 and 28 are the electronic devices, i.e., computers, in multiprocessor platform 20 that accept data, perform prescribed mathematical and logical operations at high speed, and provide the results of those operations. Thus, the controllers of platform 20 have associated therewith memory (not shown) and instructions stored in memory that are executed by the controller. It should be readily apparent to those skilled in the art that the terms "controller", "processor", and "computer" are often used interchangeably. The term "controller" is used herein merely to clearly make a distinction between the processor elements (discussed below) of data security system 26 and the other hardware resources of multiprocessor platform 20.

Multiprocessor platform 20 adheres to a RED-BLACK concept. The RED-BLACK concept in secure communications is a concept in which electrical circuits, fiber optic circuits, modems, transmitters, and so forth, that handle plain text security classified information (RED) is separated from items that handle encrypted security classified information (BLACK). This separation is desirable because of the level of protection that is afforded each category.

Accordingly, first controllers 24 are designated to process a first data set 46, or data stream, exhibiting a first data type. For clarity of illustration, a data type of first data set 46 is a plain, or RED, data type. Thus, first data set 46 is referred to hereinafter as plain text data 46. Likewise, second controllers 28 are designated to process a second data set 48, or data stream, exhibiting a second data type. For clarity of illustration, the data type of second data set 48 is an encrypted, or BLACK, data type. Thus, second data set 48 is referred to hereinafter as cipher text data 48.

First controllers 24 receive plain text data 46 at input 34 and provide plain text data 46, via first communication bus 30, to input 36 of data security system 26. First controllers 24 are labeled R1, R2, and R3 to clearly characterize their role of processing plain text data 46, i.e., RED data. Second controllers 28 process data received from output 40 of data security system 26, and output cipher text data 48 at output 44 of multiprocessor platform 20. Hence, second controllers 28 are labeled B1 and B2 to clearly characterize their role of processing cipher text data 48, i.e., BLACK data. Data security system 26 provides the physical separation between first controllers 24 and second controllers 28, and will be described in detail below. Separation is also provided between busses 30 and 38.

Multiprocessor platform 20 may be realized in a communication system, a computing network, or any other distributed processing environment in which the software components of the data processing are performed by separate controllers. By way of example, input 34 may receive voice data from a microphone. This voice data (plain text data 46) is subsequently processed by first controllers 24 for example by filtering and amplifying the signal. The voice data is then forwarded to data security system 26 for encryption. Following encryption, the encrypted voice data (cipher text data 48) may be further processed, for example, by digitizing, modulating, packetizing, and so forth. The encrypted voice data (cipher text data 48) is then provided at output 44 which may be in communication with an antenna for over-the-air transmission of cipher text data 48.

Platform 20 is an illustrative multiprocessor platform shown to clarify the understanding of the present invention. Those skilled in the art will readily recognize that a multiprocessor platform may arranged in any of a number of configurations with any number of controllers as long as data security system 26 provides the physical separation between the controllers processing plain text data and the controllers processing cipher text data. That is, all plain text data 46 is advantageously input into data security system 26 and manipulated by data security system 26 to generate cipher text data 48 before it is received and further processed at second controllers 28.

For clarity of illustration, multiprocessor platform 20 only shows distributed application 22 processing input plain text data 46 and the subsequent manipulation of plain text data 46 to form cipher text data 48. However, it should be understood that data flow may be bidirectional through multiprocessor platform 20. As such, either distributed application 22 or a second, concurrently executing distributed application (not shown) processes cipher text data 48 input into multiprocessor platform 20 at output 44 to form plain text data 46 for output at input 34.

Distributed application 22 is implemented utilizing object oriented programming to form a chain of linked data processing objects, or application objects 50, labeled O1, O2, O3, O4, and O5. Object oriented programming, as is well known in the art, is a technique for structuring computer software that models the real world through representation of "objects" or modules that contain data as well as instructions that work upon that data. These objects are the encapsulation of the attributes, relationships, and object methods of software-identifiable program components. Object oriented programming is used to design computer software that is easy to create, cost effective to modify, and reusable.

As is well known in the art, an "object" is the basic building block of a program, such as distributed application 22. Normally, an object has one or more attributes (data structure) that collectively define the state of the object. The object also has behavior defined by a set of object methods (procedures) that modify those attributes, and an identity that distinguishes it from other objects.

Each object is made into a generic class of object. In object oriented programming, a "class," is a template definition of the object methods and the data content (variables) in a specific type of object. A class can have subclasses that can inherit all or some of the characteristics of the class. In relation to each subclass, the class becomes the superclass. Subclasses can also define their own object methods and variables that are not part of their superclass, and the structure of a class and its subclasses is called the class hierarchy.

Thus, an object is a specific instance, or an instantiation, of a class and contains real values instead of variables. The object is executed on a controller and its object methods provide computer instructions and class object characteristics provide relevant data. Since a class defines only the data it needs to be concerned with, when an object is executed, the code is unable to accidentally access other program data which ensures data integrity among the set of objects in an application.

Distributed application 22 is generated by an application developer, i.e., programmer, to perform a specific function or functions. The application developer allocates, or maps, specific application objects 50 to specific hardware resources, that is, controllers, within multiprocessor system 20. For example, a first one of application objects 50, labeled O1, is loaded and executed on first controller 24, labeled R2. Likewise, second and third ones of application objects 50, labeled O2 and O3, are loaded and executed on first controller 24, labeled R1. In addition, a fifth one of application objects 50, labeled O5, is loaded and executed on second controller 28, labeled B1.

Application object 50, labeled O4, is loaded and executed on data security system 26, and will be referred to hereinafter as a cryptographic object 52. In a preferred embodiment, cryptographic object 52 is allocated exclusively to data security system 26 and is executable exclusively on data security system 26 to perform cryptographic services and to ensure separation between plain text data 46 and cipher text data 48 (discussed below). In other words, data security system 26, executing cryptographic object 52, prevents plain text data 46 from being output at output 44. Likewise, data security system 26, executing cryptographic object 52, functions in the opposite direction to prevent cipher text data 48 from being output at input 34.

The programmer links application objects 50, labeled O1, O2, O3, O4, and O5, and maps application objects 50 to particular hardware resources of platform for successive manipulation of a data stream containing plain text data 46 by first controllers 24, data security system 26, and second controllers 28 to obtain cipher text data 48. Accordingly, distributed application 22 is the sum of its linked application objects 50.

Application objects 50 interact with each other and multiprocessor platform 20 through well defined interfaces called messaging to perform the functionality of distributed application 50. In order to facilitate communication between application objects 50 distributed across multiple controllers, distributed object communication mechanisms have been created. These distributed object communication mechanisms are also referred to as middleware.

One such distributed object communication mechanism is Common Object Request Broker Architecture (CORBA). CORBA is an Object Request Broker (ORB) standard that provides for standard object oriented interfaces between ORBs, as well as to external applications and application platforms. The advantage is that of interoperability of object oriented software systems residing on disparate platforms. Additionally, CORBA provides for portability of such systems across platforms.

The ORB allows application objects 50 to transparently make requests to, and receive responses from, other application objects 50 located locally or remotely. Using an ORB, a client application object can transparently invoke an object method on a server application object that can be on the same machine or across a network. The ORB intercepts the call and is responsible for finding an object that can implement the request, pass it the parameters, invoke its object method, and return the results. The client application object does not have to be aware of where the object is located, its programming language, its operating system, or any other system aspects that are not part of an object's interface. The client/server roles are only used to coordinate the interactions between two application objects.

An ORB uses an interface definition language to "broker" communication between application objects 50. Interface definition language is a general term for a language that lets an application or application object 50 written in one language communicate with another program or application object 50 written in an unknown language. Interface definition language works by requiring that an application's interfaces be described in a slight extension, also referred to as a stub, of the program that is compiled into it.

Figure 2:
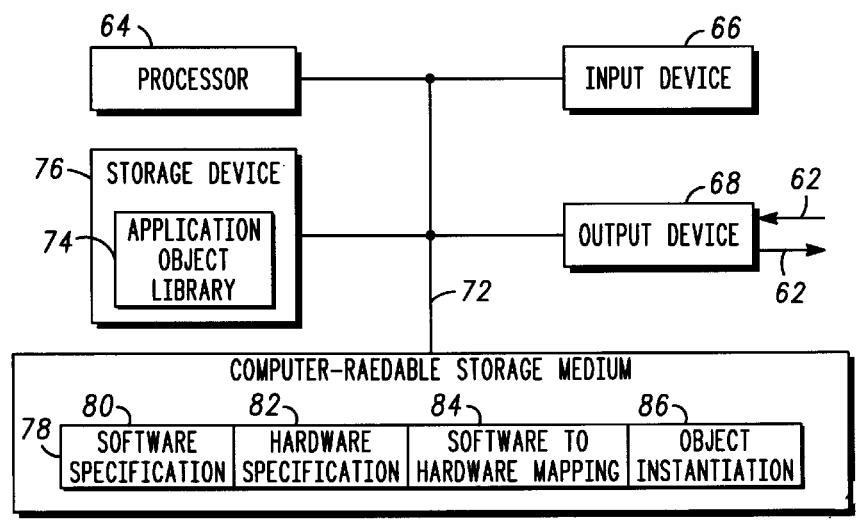
FIG. 2 shows a block diagram of an application development computing system for developing the distributed application.

FIG. 2 shows a block diagram of an application development computing system 60 utilized by an application developer for developing distributed application 22 (FIG. 1). Application development computing system 60 may be linked via a communication link 62 to multiprocessor platform 20 (FIG. 1). System 60 includes a processor 64 in communication with an input device 66, an output device 68, and a computer-readable storage medium 70. These elements are interconnected by a bus structure 72.

Processor 64 includes a data reader (not shown) for reading data, such as an application object library 74, from a storage device 76. The data reader may include a hard disk drive internal or external to processor 64, a tape drive, floppy disk drive, CD-ROM, or a combination thereof. Storage device 76 may be a hard disk, floppy disk, a compact disk, a personal computer memory card international association (PCMCIA) card, and the like.

Application object library 74, also known as an object database, includes a software implementation for each of application objects 50 (FIG. 1), and is accessed by the developer when developing distributed application 22 (FIG. 1). Of particular relevance to the present invention, application object library 74 includes a software implementation for data security object 52 (FIG. 1) and will be discussed in detail below.

Input device 66 can encompass a keyboard, mouse, pointing device, audio device (e.g., a microphone), or any other device or devices providing input to processor 64. Output device 68 can encompass a display, a printer, an audio device (e.g., a speaker), or other devices providing output from processor 64. Input and output devices 66 and 68 can also include network connections, modems, or other devices used for communications with other devices or computer systems, such as multiprocessor platform 20.

Computer-readable storage medium 70 may be a hard disk drive internal or external to processor 64, a magnetic disk, compact disk, or any other volatile or non-volatile mass storage system readable by processor 64. Computer-readable storage medium 70 may also include cooperating or interconnected computer readable media, which exist exclusively on computing system 60 or are distributed among multiple interconnected computer systems (not shown) that may be local or remote.

Executable code 78 is recorded on computer-readable storage medium 70 and implemented by the application developer for instructing processor 64 to form distributed application 22 (FIG. 1) including cryptographic object 52 (FIG. 1). In an exemplary illustration, executable code 78 is functionally subdivided into a software specification module 80, a hardware specification module 82, a software-to-hardware mapping module 84, and an object instantiation module 86.

Distributed application 22 (FIG. 1) includes distributed software objects, i.e., application objects 50 (FIG. 1), that are loaded and executed on first controllers 24 (FIG. 1), data security system 26 (FIG. 1), and second controllers 28 (FIG. 1). Software specification module 80 defines information relating to each of application objects 50 in distributed application 22, the relationships between application objects 50, and the operations performed on application objects 50 at different times throughout the lifecycle of distributed application 22. These relationships include, for example, how each of application objects 50 interact with each other for the purpose of defining data flow and control. Hence, definition of these relationships allows application objects 50 to be connected together without consideration for their physical location in multiprocessor platform 20 (FIG. 1). The ORB allows for the transparent relocation of objects once the relationships are defined.

Of particular relevance to the preferred embodiment of the present invention, software specification module 80 includes a unique identifier for cryptographic object 52 (FIG. 1) and a pointer to application object library 74. In addition, software specification module 80 defines the relationship between cryptographic object 52 and application objects 50 (FIG. 1) that process plain text data 46 (FIG. 1), and the relationship between cryptographic object 52 and application objects 50 that process cipher text data 48 (FIG. 1).

Hardware specification module 82 includes the physical hardware/firmware resources required by distributed application 22 (FIG. 1), the hardware topology of multiprocessor platform 20, and the dependency in physical connectivity between hardware elements of platform 20. Hardware specification module 82 is employed so that the actual available system resources, i.e., first controllers 24, data security system 26, and second controllers 28, of multiprocessor platform 20 can be allocated to distributed application 22. Specifying the resources in terms of mandatory and desirable characteristics, as opposed to naming specific hardware elements supports the portability of distributed application 22 across multiprocessor platforms and configurations.

Of particular relevance to the preferred embodiment of the present invention, hardware specification module 82 groups first controllers 24 as those hardware resources interconnected by first communication bus 30 (FIG. 1) and operable on plain text data (FIG. 1). In addition, hardware specification module 82 groups second controllers 28 as those hardware resources interconnected by second communication bus 38 (FIG. 1) and operable on cipher text data, and identifies data security system 26 as the hardware resource whose input 36 (FIG. 1) is connected to first communication bus 30, and whose output 40 is connected to second communication bus 38.

Software-to-hardware mapping module 84 includes the instructions employed to map application objects 50 (FIG. 1) to the particular hardware resources of multiprocessing platform 20 (FIG. 1). In other words, for each application object 50, software-to-hardware mapping module 84 determines on which of first controllers 24, data security system 26, and second controllers 28, application object 50 may be loaded. For example, software-to-hardware mapping module 84 includes instructions for mapping cryptographic object 52 exclusively onto data security system 26.

Object instantiation module 86 includes instructions employed to create distributed application 22 (FIG. 1). That is, object instantiation module 86 performs tasks such as allocating the hardware resources, i.e. first controllers 24, data security system 26, and second controllers 26 for each of application objects 50. Once the hardware resources are allocated, object instantiation module 86 constructs each of application objects 50 onto the allocated first controllers 24, data security system 26, and second controllers 26. Each application object 50 is provided with initial attribute values, is supplied with references to its peer objects, i.e., is linked to its upstream (data source) objects and to its downstream (data sink) objects, is initialized, then activated.

Distributed application 22 may be loaded onto the allocated hardware resources of multiprocessor platform 20 in a number of ways. For example, object instantiation module 86 may construct each of application objects 50 onto the allocated first controllers 24, data security system 26, and second controllers 28 through data transfer from application development computing system 60 over communication link 62 to a data input (not shown) on black side 109 (FIG. 1) of multiprocessor platform 20 (FIG. 1).

It should be readily apparent to those skilled in the art that in multiprocessor platforms utilizing cryptography, the flow of data across the RED/BLACK boundary should be carefully controlled (for example, when application objects 50 are loaded from BLACK side 109 onto first controllers 24 (FIG. 1) on RED side 107). This control may be accomplished using data verification, throughput controls, digital signatures verified at load time, and/or the loading of a security kernel that subsequently loads distributed application 22 onto the appropriate hardware resources.

Figure 3:
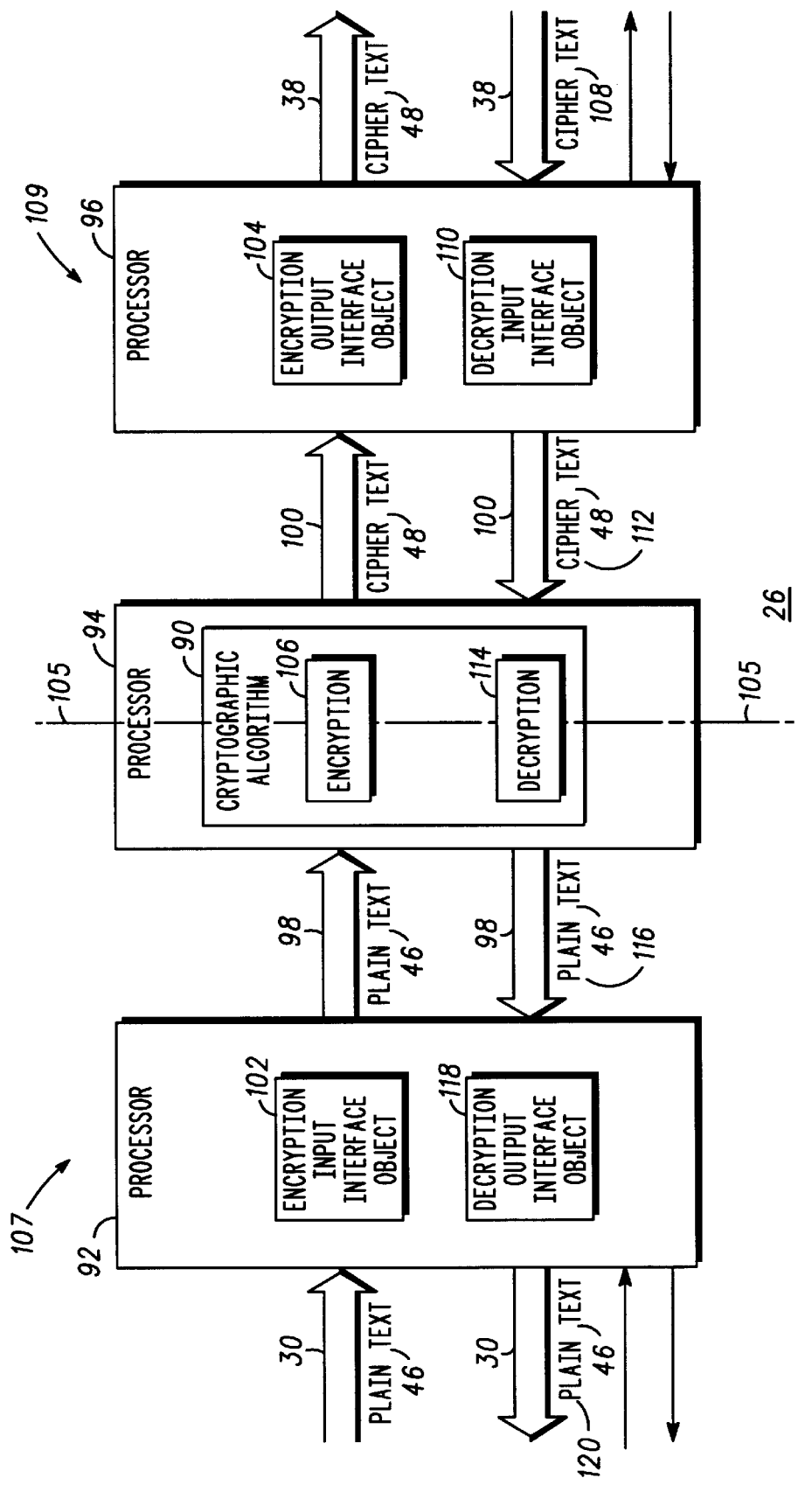
FIG. 3 shows a block diagram of a data security system of the multiprocessor platform for providing cryptographic services.

FIG. 3 shows a block diagram of data security system 26 of multiprocessor platform 20 (FIG. 1) for providing cryptographic services. In a preferred embodiment, data security system 26 is the exclusive, or sole, hardware component within multiprocessor platform 20 that may execute cryptographic object 52 (FIG. 1) to provide cryptographic services. Data security system 26 provides cryptographic services through the execution of a cryptographic function 90.

Data security system 26 includes a first processor element 92, a second processor element 94, and a third processor element 96. First processor element 92 is in communication with first controllers 24 (FIG. 1) via first communication bus 30. A first data bus 98 is coupled between first processor element 92 and second processor element 94, and a second data bus 100 is coupled between second processor element 94 and third processor element 96. Third processor element 96 is in communication with second controllers 28 (FIG. 1) via second communication bus 38.

When distributed application 22 is created, executing the instructions of object instantiation module 86 (FIG. 2), an encryption input interface object 102 is assigned for implementation on first processor 92. That is, encryption input interface object 102 is loaded and executed on first processor 92. Likewise, when distributed application 22 is created, an encryption output interface object 104 is assigned for implementation on third processor 96. That is, encryption output interface object 104 is loaded and executed on third processor 96.

Encryption input interface object 102 and encryption output interface object 104 are two halves of a "container" that form an interface between distributed application 22 and an encryption portion 106 of cryptographic function 90 executed on second processor 94. Encryption input interface object 102 and encryption output interface object 104 are implemented as application programming interfaces (APIs) between distributed application 22 and encryption portion 106 of cryptographic function 90.

Encryption input interface object 102 and encryption output interface object 104 are APIs that request cryptographic services from cryptographic function 90 and return data manipulated by cryptographic function 90 to distributed application 22. This is accomplished by linking encryption input interface object 102, encryption portion 106 of cryptographic function 90, and encryption output interface object 104 to create cryptographic object 52 (FIG. 1). Thus, cryptographic object 52 causes successive processing of a data stream containing plain text data 46 to obtain cipher text data 48.

Cryptographic function 90, assigned to second processor 94 during the creation of cryptographic object 52, enforces cryptographic rules and performs the actual cryptographic functions. Cryptographic function 90 may include capabilities for communication channel verification, multilevel security, command validation, covert channel awareness, and separation kernel. Cryptographic function 90 is a software cryptographic implementation that is downloaded to second processor 94. As cryptographic functions evolve, data security system 26 need not change. Rather, the cryptographic functions are upgraded through the download of new software. This advantageously results in cost saving over hardware cryptographic systems, and is readily extended for increasing cryptographic capability.

Cryptographic object 52 appears as a single one of application objects 50 (FIG. 1) to the upstream data source, i.e., first controller 24, labeled R1, (FIG. 1) executing application object 50, labeled 03. Likewise, cryptographic object 52 appears as a single one of application objects 50 to the downstream data sink, i.e., second controller 28, labeled B1, (FIG. 1) executing application object 50, labeled 05.

Encryption input interface object 102 and encryption output interface object 104 coordinate to ensure that functions which result in data being moved across a boundary separating plain text data and cipher text data, i.e., a RED/BLACK boundary 105, established at data security system 26 are done so in a timely fashion and are delivered to the correct downstream application object 50 (FIG. 1). This implementation of cryptographic object 52 is hidden to the developer of distributed application 22 thus providing the benefits associated with object oriented systems of more thorough data analysis, reduced development time, more accurate coding, greater system security, and the avoidance of unintended data corruption.

As shown, plain text data 46 is received at first processor element 92 over first communication bus 30 from first controller 24, labeled R1, (FIG. 1), following execution of application object 50, labeled O3 (FIG. 1). Plain text data 46 is received at a RED side 107 of data security system 26 in response to the execution of encryption input interface object 102 by first processor element 92. That is, encryption input interface object 102 enables the receipt of plain text data from first controller 24, labeled R1.

Encryption input interface object 102 subsequently forwards plain text data 46 from first processor 92 to second processor 94 over first data bus 98. At second processor element 94, encryption portion 106 of cryptographic function 90 encrypts plain text data 46 to generate cipher text data 48.

Second processor element 94 forwards cipher text data 48 to third processor element 96 over second data bus 100. Cipher text data 48 is received in response to the execution of encryption output interface object 104 by third processor 96. In other words, encryption output interface object 104 enables the receipt of cipher text data 48 from encryption portion 106 executed on second processor element 94. Cipher text data 48 is subsequently directed from third processor 96 to second controller 28, labeled B1, (FIG. 1) via second communication bus 38.

Bidirectional data flow through cryptographic object 52 is schematically represented by a third data set 108 being received at third processor element 96. Third data set 108 is an encrypted data type, cipher text data 48. Third data set 108 of cipher text data 48 is received at a BLACK side 109 of data security system 26 in response to the execution of a decryption input interface object 110 by third processor element 96. In other words, decryption input interface object 110 enables the receipt of cipher text data 48 from a data source (i.e. one of second controllers 28).

Decryption input interface object 110 subsequently enables the routing of third data set 108 of cipher text data 48 from third processor 96 to second processor 94 over second data bus 100, as represented by an arrow 112. Second processor element 94, executes a decryption portion 114 of cryptographic function 90 to decrypt third data set 112 cipher text data 48 to produce a fourth data set 116 of plain text data 46.

Fourth data set 116 of plain text data 46 is received at first processor element 92 from second processor element 94 over first data bus 98. Fourth data set 116 of plain text data 46 is received in response to the execution of a decryption output interface object 118 by first processor element 92. Plain text data 46 is subsequently directed from first processor element 92 to one of first controllers 24 (FIG. 1) on RED side 107 via first communication bus 30, as indicated by an arrow 120.

Thus, decryption input interface object 110 and decryption output interface object 118 are implemented as application programming interfaces (APIS) between distributed application 22 and decryption portion 114 of cryptographic function 90.

As discussed previously, cryptographic object 52 is created at application development computing system 60 (FIG. 2) by a developer through the execution of executable code 78 (FIG. 2). Encryption input interface object 102, encryption output interface object 104, decryption input interface object 110, and decryption input interface object 118 of cryptographic object 52 are loaded, initialized, and activated on their respective first and second processor elements 92 and 96.

In a preferred embodiment, encryption input interface object 102 is a general-purpose cryptographic unit for enabling 12 kbps and 16 kbps traffic encryption, outputting traffic and controls received from RED side 107 to BLACK side 109, and supporting a FlowController interface. Table 1 indicates exemplary keys and values used when calling a Construct( ) object method for encryption input interface object 102.

TABLE 1

| Key | Value | Notes |
| --- | --- | --- |
| wvc | In the range [1 . . . 32]. | Synchronization and coordination with associated encryption output interface object 104 |
| function | infosec::encrypt | Type of cryptographic function |
| mode | infosec::TransmitVoice, infosec::TransmitData | Specific to the type of cryptography |
| priority | In the range [4 . . . 6] | Suggested values. |

Table 2 indicates the base classes from which encryption input interface object 102 is derived.

TABLE 2

```
fw_Testable
   |
   +--fw_Controllable
      |
      +--fw_Initializable
         |
         +--fw_Activatable
            |
            +--flow_Transform
               |
               +--flow_FlowController
                  |
                  +--infosec_Encryptor
```

Appendix A provides an example of how object methods for creating an encryption input interface object 102 application programming interface (API) could be presented in application object library 74 (FIG. 2).

Encryption output interface object 104 is a general-purpose cryptographic unit that coordinates with encryption input interface object 102 to ensure that cipher text data 48 (FIG. 1) is delivered to the correct downstream application objects 50, labeled B1 and B2 (FIG. 1). Table 3 indicates the exemplary keys and values used when calling the Constructo( ) object method for creating encryption output interface object 104.

TABLE 3

| Key | Value | Notes |
| --- | --- | --- |
| wvc | [1 . . . 32] | Synchronization and coordination with associated encryption input interface object 102 |
| function | infosec_encrypt | Type of cryptographic service |
| mode | infosec_TransmitVoice infosec_TransmitData | Specific to the type of cryptography |
| keytag_index keytag_short_title keytag_edition keytag_register keytag_segment keytag_use keytag_class keytag_text | [0 . . . 1023] [0 . . . 4, 294, 967, 295] [0 . . . 255] infosec_Key_TrafficEncryptionKey | The key tag identifies a traffic encryption key (TEK). |
| priority | [4 . . . 6] | Suggested values. |

Appendix B provides an example of how object methods for creating an encryption output interface object 104 API could be presented in application object library 74 (FIG. 2).

In a preferred embodiment, decryption input interface object 110 is a general-purpose cryptographic unit that coordinates with decryption output interface object 118 to enable traffic decryption. Table 4 indicates the exemplary keys and values used when calling the Constructo( ) object method for creating encryption output interface object 110.

TABLE 4

| Key | Value | Notes |
| --- | --- | --- |
| wvc | [1 . . . 32] | Synchronization and coordination with associated decryption output interface object 118 |
| function | infosec_decrypt | Type of cryptographic service |
| mode | infosec_ReceiveVoice infosec_ReceiveData | Specific to the type of cryptography |
| keytag_index keytag_short_title keytag_edition keytag_register keytag_segment keytag_use keytag_class keytag_text | [0 . . . 1023] [0 . . . 4, 294, 967, 295] [0 . . . 255] infosec_Key_TrafficEncryptionKey | The key tag identifies a traffic encryption key (TEK). |
| priority | [4 . . . 6] | These are suggested values. |

Appendix C provides an example of how object methods for creating decryption input interface object 110 API could be presented in application object library 74 (FIG. 2).

Decryption output interface object 118 is a general-purpose cryptographic unit for enabling 12 kbps and 16 kbps traffic decryption, and for supporting a FlowControllable interface. Table 5 indicates the exemplary keys and values used when calling the Constructo( ) object method for creating decryption output interface object 118.

TABLE 5

| Key | Value | Notes |
| --- | --- | --- |
| wvc | In the range [1 . . . 32]. | Synchronization and coordination with associated decryption input interface object 110 |
| function | infosec::decrypt | Type of cryptographic service |
| mode | infosec::ReceiveVoice, infosec::ReceiveData | Specific to the type of cryptography |
| priority | In the range [4 . . . 6]. | Suggested values. |

Table 6 indicates the base classes from which decryption output interface object 118 is derived.

TABLE 6

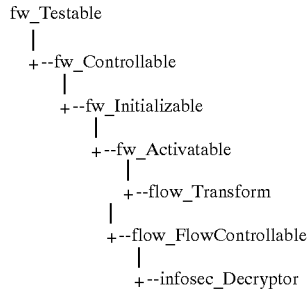

Appendix D provides an example of how object methods for creating a decryption output interface object 118 could be presented in application object library 74 (FIG. 2).

In summary, the present invention provides of a system and a method for providing cryptographic services which ensure the separation of plain text data from cipher text data. Separation of the plain text data from the cipher text data is accomplished through the inclusion of a data security system that serves as a boundary between plain text data and cipher text data. The system and method separate the cryptographic functions from a distributed application supported by a multiprocessor platform. A cryptographic function is executable exclusively on the data security system and is encapsulated by an input interface object and an output interface object. Together the input interface object, the cryptographic function, and the output interface object form a cryptographic object of the distributed application. The separation of cryptographic functions from the distributed application supports faster development and execution of security enabled distributed applications, allows for reduced maintenance costs due to the utilization of object oriented programming, and allows for the extension of cryptographic capabilities as cryptographic functions evolve.

Although the preferred embodiments of the invention have been illustrated and described in detail, it will be readily apparent to those skilled in the art that various modifications may be made therein without departing from the spirit of the invention or from the scope of the appended claims.

Appendix A

The following examples show how object methods for encryption input interface object 102 may be implemented in an interface definition language.

Initialize: This object method initializes encryption input interface object 102.

```
void
Encryptor::Initialize( )
    Return Value: None.
    Parameters: None.
    Exceptions: General
```

Finalize: This object method releases any resources allocated to encryption input interface object 102 (by the Initialize( ) object method) prior to termination.

```
void
Encryptor::Finalize( )
    Pre-Conditions: The Deactivate( ) object method
        should have been invoked prior to invoking the
        Finalize( ) object method.
    Return Value: None.
    Parameters: None.
    Exceptions: General
```

Activate: This object method makes encryption input interface object 102 available for use.

```
void
Encryptor::Activate( )
    Pre-Conditions: The Initialize( ) object method should
        have been invoked prior to invoking the Activate( )
        object method.
    Return Value: None.
    Parameters: None.
    Exceptions: General
```

Deactivate: This object method makes encryption input interface object 102 unavailable for use. It "undoes" the effects of the Activate( ) object method.

```
void
Encryptor::Deactivate( )
    Return Value: None.
    Parameters: None.
    Exceptions: General
```

Query: This object method causes encryption input interface object 102 to respond with its present state information. The object method fills in the Value field of the AssocSequence with the present state of encryption input interface object 102. Valid keys and value types are listed in the following table.

```
void
Encryptor::Query(inout fw::AssocSequence pParams)
```

| Key | Type | Values | Description |
|---|---|---|---|
| prev_source | tObjectRefm | | Reference to object which will be flow controlled. |
| tfm_control_notify | tObjectRefm | | Object to which events are reported. May be set to NULL. |
| in_packet_size | tLongm | | Number of elements expected to be in an input TFM sequence. |
| input_type | fw::Typesm | tBitSeq, tLoatSeq, toctetSeq, tLongSeq, tUnsignedLongSeq | Format of data received from previous object. |

-continued

| Key | Type | Values | Description |
|---|---|---|---|
| priority | tUnsignedLong m | Set to:<br>1: High<br>...<br>7: Low | Priority assigned to this object. |

Return Value: None.
Parameters: pParams (in/out)—Sequence of associations to be looked up.
Exceptions: fw::AssocProblem
Refresh: This object method is used to update the encryption input interface object 102 state. Valid keys and value types are listed in the following table.
void
Encryptor::Refresh(in fw::AssocSequence pParams)

| Key | Type | Values | Description |
|---|---|---|---|
| prev_source | tObjectRef | | Object to which the transform will send flow control information. |
| tfm_control_notify | tObjectRef | | Object to which events are reported. May be set to NULL. |
| in_packet_size | tLong | | Number of elements expected to be in an input TFM sequence. |
| input_type | fw::Types | tBitseq, tFloatseq, tOctetSeq, tLongSeq, tUnsignedLongSeq | Format of data to be received from previous object. |
| priority | tUnsignedLong | Set to:<br>1: High<br>...<br>7: Low | Priority assigned to this object. |

Return Value: None.
Parameters: pParams (in)—Sequence of associations to set the internal attributes of the object with.
Exceptions: fw::AssocProblem
prev source→On: This object method is used to direct the data source object (for example, first controller 24, labeled R1) to start sending data. The RPP acts as a FlowController for its FlowControllable data source object (identified by the prev_source reference). The FlowControllable object must provide an On( ) object method interface compatible with the following signature.
oneway void
XXX::On(in long NumOfPackets)
Pre-Conditions: The Activate( ) object method should have been invoked prior to using this object method. The prev_source parameter should have been set via a Refresh( ) objectmethod.
Return Value: None.
Parameters: NumOfPackets (in)—The number of packets the recipient wants. If set to 0, it indicates a continuous flow of data.
Exceptions: None.
prev source→Off: This object method is used to direct the data source object (for example, first controller 24, labeled R1) to stop sending data. The RPP acts as a FlowController for its FlowControllable data source object (identified by the prev_source reference). The FlowControllable object should provide an Off( ) object method interface compatible with the following signature.
oneway void
XXX::Off( )
Pre-Conditions: The Activate( ) object method should have been invoked prior to using this object method. The prev_source parameter should have been set via a Refresh( ) object method.

Return Value: None.
Parameters: None.
Exceptions: General
TFM: This object method receives both control information and plain text data 46 from RED side 107 and forwards it to encryption portion 106 of cryptographic function 90 for encryption and delivery to BLACK side 109. The mapping of data input to the TFM to output sent the BLACK side 109 is shown in the following table.
oneway void
Encryptor::TFM(in fw::uSequence pData, in fw::AssocSequence pcontrol)

| Input to TFM | Output to Next Object |
|---|---|
| Null PT Data In with "begin" control set | RTS indication |
| PT_Data_In | Plain text for encryption |
| PT Data In with "end" control set | Plain text for encryption followed by EOM |

Pre-Conditions: The back parameter should have been set via a Refresh( ) object method. The Activate( ) object method should have been invoked prior to using this method.

Return Value: None.

Parameters: pData (in)—A sequence of elements containing the data to be processed. pcontrol (in) —A sequence of key/value pairs that provide control messages. Refer to the following table for a list of parameters.

Exceptions: None.

| Key | Type | Values | Description |
|---|---|---|---|
| begin | tBoolean | true | Sent without data, indicates RTS from RED side 107. If sent, must be first element in list and "end" key must not be present. |
| end | tBoolean | true | Sent with or without data, it indicates the EOM should be generated and sent. If sent, must be first element in list and "begin" key must not be present. |

Appendix B

The following examples show how object methods for encryption output interface object 104 may be implemented as C bindings.

Initialize: This method initializes encryption output interface object 104.

void fw_Initializable_Initialize(orb_tObjectRef*pobject, orbEnv*pEnv)

Return Value: None.

Parameters:

| Parameter | In, Out, In/Out | Values |
|---|---|---|
| pObject | In/Out | Run time pointer |
| pEnv | In/Out | Run time pointer |

Exceptions: None

Finalize: This object method releases any resources allocated to encryption output interface object 104 (by the Initialize( ) object method) prior to termination.

void fw_Initializable_Finalize(orb_tObjectRef*pobjcte, orbEnv*pEnv)

Return Value: None.

Parameters:

| Parameter | In, Out, In/Out | Values |
|---|---|---|
| pObject | In/Out | Run time pointer |
| pEnv | In/Out | Run time pointer |

Exceptions: None

Activate: This object method makes encryption output interface object 104 available for use.

void fw_Activatable_Activate(orb_tObjectRef*pobject, orbEnv*pEnv)

Return Value: None.

Parameters:

| Parameter | In, Out, In/Out | Values |
|---|---|---|
| pObject | In/Out | Run time pointer |
| pEnv | In/Out | Run time pointer |

Exceptions: None

Deactivate: This object method makes encryption output interface object 104 unavailable for use. It "undoes" the effects of the Activate( ) object method.

void fw_Activatable_Deactivate( )orb_tObjectRef*pobject, orbEnv*pEnv)

Return Value: None.

Parameters:

| Parameter | In, Out, In/Out | Values |
|---|---|---|
| pObject | In/Out | Run time pointer |
| pEnv | In/Out | Run time pointer |

Exceptions: None

Query: This object method causes encryption output interface object 104 to respond with its present state information. Valid keys and value types are listed in the following table.

void fw_Controllable_Query(orb_tObjectRef*pobject, fw_AssocSequence**pParams, orbEnv*pEnv)

| Key | Type | Valid Range |
|---|---|---|
| next | orb_tObjectRef * | |
| tfm_control_notify | orb_tObjectRef * | |
| out_packet_size | CORBA_long | |
| output_type | CORBA_unsigned_long | fw_tBitseq, fw_tFlowSeq, |

-continued

| Key | Type | Valid Range |
|---|---|---|
| preamble_depletion_factor | CORBA_long | fw_tOctetSequence, fw_tLongSeq, fw_tUnsignedLongSeq pdf < 0: sends CTS prior to start of preamble pdf >= 0: send CTS when there are pdf bits remaining in preamble |
| phasing_mode | infosec_encrypt_phasing | |
| priority | CORBA_unsigned_long | [1 . . . 7] |

Return Value: None.
Parameters:

| Parameter | In, Out, In/Out | Values |
|---|---|---|
| pObject | In/Out | Run time pointer |
| pParams | In/Out | List of keys and returned values. |
| pEnv | In/Out | Run time pointer |

Exceptions: fw_AssocProblem
Refresh: This object method is used to update encryption output interface object 104 state. Valid keys and value types are listed in the following table.

```
void
   fw_Controllable_Refresh(orb_tObjectRef*pObject,
      fw_AssocSequence*pparams, orbEnv*pEnv)
```

| Key | Type | Valid Range |
|---|---|---|
| next | orb_tObjectRef * | |
| tfm_control_notify | orb_tObjectRef * | |
| out_packet_size | CORBA_long | |
| output_type | CORBA_unsigned_long | fw_tBitSeq, fw_tFlowSeq, fw_tOctetSequence, fw_tLongSeq, fw_tUnsignedLongSeq |
| keytag_index | CORBA_unsigned_long | [0 . . . 1023] |
| keytag_short_title | char * | |
| keytag_edition | CORBA_unsigned_long | |
| keytag_register | CORBA_unsigned_long | [0 . . . 4, 294, 967, 295] |
| keytag_segment | CORBA_unsigned_short | |
| keytag_use | CORBA_unsigned_long | infosec_Key_TrafficEncryptionKey |
| keytag_class | CORBA_unsigned_long | |
| keytag_text | char * | |
| priority | CORBA_unsigned_long | [1 . . . 7] |

Return Value: None.
Parameters:

| Parameter | In, Out, In/Out | Values |
|---|---|---|
| pObject | In/Out | Run time pointer |
| pParams | In | List of keys and values. |
| pEnv | In/Out | Run time pointer |

Exceptions: fw_AssocProblem next→TFM: This object method delivers both control information and cipher text data 48 to the next object in the chain, which has the standard signature for a TFM (This is supplied via the Refresh( ) object method.). Required signature for next→TFM.

```
void
   XXX_XXX_TFM(orb_tObjectRef*pobject,
      fw_usequence*pData, CORBA_sequence_
      Assoc*pControl, orbEnv*pEnv)
```

Return Value: None.

Parameters:

| Parameter | In, Out, In/Out | Values |
|---|---|---|
| pObject | In/Out | Run time pointer |
| pData | In | Of type tBitSeq, tLongSeq, or tUnsignedLongSeq |
| pControl | In | List of keys and values. |
| pEnv | In/Out | Run time pointer |

Appendix C

The following examples show how object methods for decryption input interface object 110 may be implemented as C bindings.

Initialize: This object method initializes decryption input interface object 110.

void
  fw_Initializable_Initialize(orb_tObjectRef*pobject, orbEnv*pEnv)
  Return Value: None
  Parameters:

| Parameter | In, Out, In/Out | Values |
|---|---|---|
| pObject | In/Out | Run time pointer |
| pEnv | In/Out | Run time pointer |

Exceptions: General

Finalize: This object method releases any resources allocated to decryption input interface object 110 (by the Initialize( ) object method) prior to termination.

void
  fw_Initializable_Finalize(orb_tObjectRef*pobjcte, orbEnv*pEnv)
  Return Value: None:
  Parameters:

| Parameter | In, Out, In/Out | Values |
|---|---|---|
| pObject | In/Out | Run time pointer |
| pEnv | In/Out | Run time pointer |

Exceptions: General

Activate: This object method makes decryption input interface object 110 available for use.

void
  fw_Activatable_Activate( orb_tObjectRef*pobject, orbEnv*pEnv)
  Return Value: None.
  Parameters:

| Parameter | In, Out, In/Out | Values |
|---|---|---|
| pObject | In/Out | Run time pointer |
| pEnv | In/Out | Run time pointer |

Exceptions: General

Deactivate: This object method makes decryption input interface object 110 unavailable for use. It "undoes" the effects of the Activate( ) object method.

void
  fw_Activatable_Deactivate(orb_tObjectRef*pobject, orbEnv*pEnv)
  Return Value: None
  Parameters:

| Parameter | In, Out, In/Out | Values |
|---|---|---|
| pObject | In/Out | Run time pointer |
| pEnv | In/Out | Run time pointer |

Exceptions: General

Query: This object method causes decryption input interface object 110 to respond with its present state information. Valid keys and value types are listed in the following table.

void
  fw_Controllable_Query(orb_tObjectRef*pobject, fw_AssocSequence**pParams, orbEnv*pEnv)

| Key | Type | Valid Range |
|---|---|---|
| tfm_control_notify | orb_tObjectRef * | |
| in_packet_size | CORBA_long | |
| input_type | CORBA_unsigned_long | fw_tBitSeq, fw_tFlowSeq, fw_tOctetSequence, fw_tLongSeq, fw_tUnsignedLongSeq |
| priority | CORBA_unsigned_long | [1 . . . 7] |

Return Value: None.
Parameters:

| Parameter | In, Out, In/Out | Values |
|---|---|---|
| pObject | In/Cut | Run time pointer |
| pParams | In/Out | List of keys and returned values. |
| pEnv | In/Out | Run time pointer |

Exceptions: fw_AssocProblem

Refresh: This object method is used to update decryption input interface object 110 state. Valid keys and value types are listed in the following table.

void
  fw_Controllable_Refresh(orb_tObjectRef*pobject, fw_AssocSequence*pParams, orbEnv*pEnv)

| Key | Type | Valid Range |
|---|---|---|
| tfm_control_notify | orb_tObjectRef * | |
| in_packet_size | CORBA_long | |
| input_type | CORBA_unsigned_long | fw_tBitSeq, fw_tFlowSeq, fw_tOctetSequence, |

-continued

| Key | Type | Valid Range |
|---|---|---|
| keytag_index | CORBA_unsigned_long | fw_tLongSeq, fw_tUnsignedLongSeq [0 . . . 1023] |
| keytag_short_title | char * | |
| keytag_edition | CORBA_unsigned_long | |
| keytag_register | CORBA_unsigned_long | [0 . . . 4, 294, 967, 295] |
| keytag_segment | CORBA_unsigned_short | |
| keytag_use | CORBA_unsigned_long | infosec_Key_TrafficEncryptionKey |
| keytag_class | CORBA_unsigned_long | |
| keytag_text | char * | |
| priority | CORBA_unsigned_long | [1 . . . 7] |

Return Value: None.
Parameters:

| Parameter | In, Out, In/Out | Values |
|---|---|---|
| pObject | In/Out | Run time pointer |
| pParams | In | List of keys and values. |
| pEnv | In/Out | Run time pointer |

Exceptions: fw_AssocProblem

TFM: This object method receives both control information and cipher text data 48 from BLACK side 109 and forwards it to decryption portion 114 of cryptographic function 90 for decryption and delivery to RED side 107.

void
   infosec_Decryptor_TFM(orb_tObjectRef*pobject,
      CORBA_sequence_long*pData,
      fw_AssocSequence*pControl, orbEnv*pEnv)
   Return Value: None
   Parameters:

| Parameter | In, Out, In/Out | Values |
|---|---|---|
| pObject | In/Out | Run time pointer |
| pData | In | Of type tBitSeq, tLongSeq, or tUnsignedLongSeq |
| pControl | In | List of keys and values. |
| pEnv | In/Out | Run time pointer |

Exceptions: None

Appendix D

The following examples show how object methods for decryption output interface object 118 may be implemented in interface definition language.

Initialize: This object method initializes decryption output interface object 118.
   void
   Decryptor::Initialize( )
      Return Value: None.
      Parameters: None.
      Exceptions: General Finalize: This object method releases any resources allocated to decryption output interface object 118 (by the Initialize( ) object method) prior to termination.
   void
   Decryptor::Finalize( )
      Pre-Conditions: The Deactivate( ) object method should have been invoked prior to invoking the Finalize( ) object method.
      Return Value: None.
      Parameters: None.
      Exceptions: General Activate: This object method makes decryption output interface object 118 available for use.
   void
   Decryptor::Activate( )
      Pre-Conditions: The Initialize( ) object method should have been invoked prior to invoking the Activate( ) object method.
      Return Value: None.
      Parameters: None.
      Exceptions: General Deactivate: This object method makes decryption output interface object 118 unavailable for use. It "undoes" the effects of the Activate( ) object method.
   void
   Decryptor::Deactivate( )
      Return Value: None.
      Parameters: None.
      Exceptions: General Query: This object method causes decryption output interface object 118 to respond with its present state information. The object method will fill in the Value field of the AssocSequence with the present state of decryption output interface object 118. Valid keys and value types are listed in the following table.
   void
   Decryptor::Query(inout fw::AssocSequence pParams)
      Return Value: None.
      Parameters: pParams (in/out)—Sequence of associations to be looked up.
      Exceptions: fw::AssocProblem

| Key | Type | Values | Description |
|---|---|---|---|
| next | tObjectRefm | | Object to which the transform function will send data. |
| tfm_control_notify | tObjectRefm | | Object to which events are reported. May be set to NULL. |
| out_packet_size | tLong | | Number of |

-continued

| Key | Type | Values | Description |
|---|---|---|---|
| | m | | elements expected to be in an output TFM sequence. |
| output_type | fw::Types m | tBitSeq, tFloatSeq, tOctetSeq, tLongSeq, tUnsignedLongSeq | Format of data to be sent to next object. |
| priority | tUnsignedLong m | Set to: 1: High ... 7: Low | Priority assigned to this container. |

Refresh: This object method is used to update decryption output interface object 118 state. Valid keys and value types are listed in the following table.

void
Decryptor::Refresh(in fw::AssocSequence pParams)
Return Value: None.
Parameters: pParams (in)—Sequence of associations to set the internal attributes of decryption input interface object 110 with.
Exceptions: fw::AssocProblem

| Key | Type | Values | Description |
|---|---|---|---|
| next | tObjectRef | | Object to which the transform function will send data. |
| tfm_control_notify | tObjectRef | | Object to which events are reported. May be set to NULL. |
| out_packet_size | tLong | | Number of elements expected to be in an output TFM sequence. |
| output_type | fw::Types | tBitSeq, tFloatSeq, tOctetSeq, tLongSeq, tUnsignedLongSeq | Format of data to be sent to next object. |
| priority | tUnsignedLong | Set to: 1: High ... 7: Low | Priority assigned to this container. | next→TFM: This object method delivers both control information and plain text data 46 to the next object in the chain, which has the standard signature for a TFM. (This is supplied via the Refres( )object method.). The mapping of data input to the TFM to output sent to the next object in the chain is shown in the following table.

oneway void
XXX::TFM(in fw::usequence pData, in fw::AssocSequence pControl)

| Input | Output to Next Object |
|---|---|
| BLACK side sends "DCD = true" indication | Null PT Data Out with "begin" control set |
| BLACK side sends cipher text | PT Data Out |
| BLACK side sends "DCD = false" indication | Null PT Data Out with "end" control set |

Pre-Conditions: The next parameter should have been set via a Refres( )object method. The Activate( ) object method should have been invoked prior to using this object method.
Return Value: None.
Parameters: pData (out)—A sequence of elements. containing the data to be sent to the next object.
Control (out)—A sequence of key/value pairs that provide control messages. Refer to the following table for a list of parameters.
Exceptions: None

| Key | Type | Values | Description |
|---|---|---|---|
| begin | tBoolean | true | Sent in response to BLACK side "DCD = true" indication. |
| end | tBoolean | true | Sent in response to BLACK side "DCD = false" indication. |

What is claimed is:

1. A data security system for providing cryptographic services in a multiprocessor platform having a first controller and a second controller, said multiprocessor platform supporting a distributed application, and said data security system comprising:

a first processor element, in communication with said first controller, for executing an input interface object implemented utilizing object oriented programming to enable receipt of a first data set exhibiting a first data type from said first controller;

a second processor element, in communication with said first processor element, for receiving said first data set from said first processor element, said second processor element executing a cryptographic function for manipulating said first data set to form a second data set exhibiting a second data type; and a third processor element, in communication with said second processor element, for executing an output interface object implemented utilizing said object oriented programming to enable receipt of said second data set from said second processor element and output said second data set to said second controller, said input interface object, said cryptographic function, and said output interface object being linked to create a cryptographic object executable exclusively on said data security system.

2. A data security system as claimed in claim 1 wherein:

said first controller executes a first application object of said distributed application;

said second controller executes a second application object of said distributed application;

said input interface object is implemented as an application programming interface (API) for allowing communication between said first application object and said input interface object and for allowing communication between said input interface object and said cryptographic function; and said output interface object is implemented as an API for allowing communication between said cryptographic function and said output interface object and for allowing communication between said output interface object and said second application object.

3. A data security system as claimed in claim 1 wherein:

said first data type is a plain text type;

said data security system further includes a data bus coupled between said first processor element and said second processor element; and said first processor element, executing said input interface object, receives said first data set exhibiting said plain text type and forwards said first data set over said data bus to said second processor element.

4. A data security system as claimed in claim 3 wherein:

said second data type is a cipher text type;

said data security system further includes a second data bus coupled between said second processor element and said third processor element; and said second processor element generates said second data set exhibiting said cipher text type and forwards said second data set over said second data bus to said third processor element.

5. A data security system as claimed in claim 1 wherein:

said third processor element is further configured to execute a second input interface object to enable receipt of a third data set from said second controller, said third data set exhibiting said second data type;

said second processor element, executing said cryptographic function, receives said third data set from said third processor element and manipulates said third data set to form a fourth data set exhibiting said first data type; and said first processor element is further configured to execute a second output interface object to receive said fourth data set forwarded from said second processor element and output said fourth data set to said first controller of said multiprocessor platform.

6. A computing method for ensuring separation of plain text data from cipher text data in a multiprocessor platform supporting a distributed application, said distributed application being implemented utilizing object oriented programming, and said method comprising:

a) allocating a first application object of said distributed application to a first controller of said multiprocessor platform;

b) allocating a cryptographic object of said distributed application to a data security system of said multiprocessor platform, said cryptographic object being executable exclusively on said data security system;

c) allocating a second application object of said distributed application to a second controller of said multiprocessor platform;

d) linking said first application object, said cryptographic object, and said second application object for successive manipulation of a data stream containing said plain text data by each of said first controller, said data security system, and said second controller to obtain said cipher text data;

e) executing said first application object on said first controller to process said plain text data;

f) executing said cryptographic object on said data security system in response to receipt of said plain text data from said first controller to transform said plain text data to said cipher text data;

g) outputting said cipher text data from said data security system; and h) executing said second application object on said second controller in response to receipt of said cipher text data from said data security system.

7. A computing method as claimed in claim 6 further comprising:

creating an input interface object portion of said cryptographic object, said input interface object portion being configured to enable receipt of said plain text data from said first controller and forward said plain text data to a cryptographic function for manipulation of said plain text data to said cipher text data; and creating an output interface object portion of said cryptographic object, said output interface object portion being configured to enable receipt of said cipher text data from said second processor and transfer said cipher text data to said second controller.

8. A computing method as claimed in claim 7 further comprising linking said input interface object portion, said cryptographic function, and said output interface object portion to cause successive processing of said data stream containing said plain text data to obtain said cipher text data.

9. A computing method as claimed in claim 7 further comprising:

assigning said input interface object portion for implementation on a first processor element of said data security system;

assigning said cryptographic function for implementation on a second processor element of said data security system, an input of said second processor element being in communication with an output of said first processor element; and assigning said output interface object portion for implementation on a third processor element of said data security system, an input of said third processor element being in communication with an output of said second processor element.

10. A computing method as claimed in claim 6 wherein said operation f) comprises:

activating an input interface object on a first processor element of said data security system;

instructing said first application object of said distributed application to send said plain text data to said first processor element, said instructing operation being performed by said input interface object in response to said activating operation;

forwarding, from said first processor element, said plain text data to a cryptographic function executable on a second processor element of said data security system; and transforming, at said second processor element, said plain text data to said cipher text data.

11. A computing method as claimed in claim 10 wherein said operation g) comprises:

activating an output interface object on a third processor element of said data security system;

instructing said cryptographic function to send said cipher text data to said third processor element, said instructing operation being performed by said output interface object in response to said activating operation; and forwarding, from said third processor element, said cipher text data to said second controller of said multiprocessor platform.

12. A computing system for ensuring separation of a first data set exhibiting a first data type manipulated by a cryptographic function to form a second data set exhibiting a second data type comprising:
- a processor;
- a computer-readable storage medium; and
- executable code recorded on said computer-readable storage medium for instructing said processor to form a cryptographic object, said executable code:
  - generating an input interface object that enables receipt of said first data set and enables transfer of said first data set to said cryptographic function;
  - generating an output interface object to enable receipt of said second data set from said cryptographic function;
  - linking said input interface object, said cryptographic function, and said output interface object to form said cryptographic object;
  - mapping said cryptographic object into a distributed application having a plurality of application objects, said application objects being allocated to a plurality of controllers that form a multiprocessor platform; and
  - allocating said cryptographic object for exclusive execution on a data security system of said multiprocessor platform.

13. A computing system as claimed in claim 12 wherein said executable code instructs said processor to link said cryptographic object with said application objects using an interface definition language.

14. A computing system as claimed in claim 12 wherein said executable code employs an interface definition language to link said input interface object, said cryptographic function, and said output interface object.

15. A multiprocessor platform for supporting a distributed application implemented utilizing object oriented programming comprising:
- a first controller for executing a first application object of said distributed application to process a first data set exhibiting a first data type;
- a data security system, in communication with said first controller, for executing a cryptographic object of said distributed application to manipulate said first data set to form a second data set exhibiting a second data type, said cryptographic object being executable exclusively on said data security system; and
- a second controller, in communication with said data security system, for executing a second application object of said distributed application to process said second data set, said first application object, said cryptographic object, and said second application object being linked for successive manipulation of a data stream containing said first data set by said first controller, said data security system, and said second controller to form said second data set.

16. A multiprocessor platform as claimed in claim 15 wherein said data security system comprises:
- a first processor element for executing an input interface object portion of said cryptographic object to enable receipt of said first data set from said first controller;
- a second processor element, in communication with said first processor element, for receiving said first data set from said first processor element, said second processor element executing a cryptographic function for manipulating said first data set to form said second data set; and
- a third processor element, in communication with said second processor element, for executing an output interface object portion of said cryptographic object to receive said second data set forwarded from said second processor element and output said second data set to said second controller.

* * * * *